(12) United States Patent
Zerwekh et al.

(10) Patent No.: US 7,104,141 B2
(45) Date of Patent: Sep. 12, 2006

(54) OPTICAL SENSOR WITH CO-LOCATED PRESSURE AND TEMPERATURE SENSORS

(75) Inventors: Paul S. Zerwekh, Shawsville, VA (US); Clark D. Boyd, Radford, VA (US); Brooks Childers, Christiansburg, VA (US); Daniel C. Blevins, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 18 days.

(21) Appl. No.: 10/653,996

(22) Filed: Sep. 4, 2003

(65) Prior Publication Data

US 2005/0050962 A1 Mar. 10, 2005

(51) Int. Cl.
*G01L 1/24* (2006.01)
(52) U.S. Cl. ............................................... 73/800
(58) Field of Classification Search .................. 73/800
See application file for complete search history.

(56) References Cited

U.S. PATENT DOCUMENTS

| | | | |
|---|---|---|---|
| 4,986,671 A * | 1/1991 | Sun et al. | 374/131 |
| 4,988,212 A * | 1/1991 | Sun et al. | 374/161 |
| 5,087,124 A | 2/1992 | Smith et al. | |
| 5,113,070 A * | 5/1992 | Smith | 250/227.21 |
| 5,183,338 A * | 2/1993 | Wickersheim et al. | 374/131 |
| 5,255,980 A * | 10/1993 | Thomas et al. | 374/161 |
| 5,301,001 A * | 4/1994 | Murphy et al. | 356/35.5 |
| 5,446,279 A * | 8/1995 | Hsu | 250/227.21 |
| 5,528,367 A | 6/1996 | Putnam et al. | |
| 5,582,170 A | 12/1996 | Soller | |
| 5,612,778 A | 3/1997 | Hall et al. | |
| 5,682,237 A | 10/1997 | Belk | |
| 5,907,403 A * | 5/1999 | Andrews et al. | 356/480 |
| 5,963,321 A | 10/1999 | Wang | |
| 6,014,215 A | 1/2000 | Kempen et al. | |
| 6,016,702 A | 1/2000 | Maron | |
| 6,056,436 A * | 5/2000 | Sirkis et al. | 374/161 |
| 6,069,686 A | 5/2000 | Wang et al. | |
| 6,125,216 A * | 9/2000 | Haran et al. | 385/12 |
| 6,563,970 B1 | 5/2003 | Bohnert et al. | |
| 6,572,265 B1 * | 6/2003 | Gotthold et al. | 374/161 |
| 6,601,458 B1 * | 8/2003 | Gysling et al. | 73/861.04 |
| 6,647,181 B1 * | 11/2003 | Jang | 385/37 |
| 6,671,055 B1 | 12/2003 | Wavering et al. | |
| 6,820,489 B1 * | 11/2004 | Fernald et al. | 73/705 |
| 6,874,361 B1 * | 4/2005 | Meltz et al. | 73/152.32 |
| 6,892,583 B1 * | 5/2005 | Baek | 73/715 |
| 2002/0159671 A1 | 10/2002 | Boyd et al. | |
| 2003/0151738 A1 * | 8/2003 | Chen | 356/213 |

* cited by examiner

OTHER PUBLICATIONS

International Search Report and Written Opinion of the International Searching Authority, mailed Feb. 15, 2006. For PCT/US04/28625, international filing date Sep. 2, 2004.

*Primary Examiner*—Max Noori
(74) *Attorney, Agent, or Firm*—The H.T. Than Law Group

(57) ABSTRACT

An optical sensor that includes multiple filter cavities for the simultaneous, co-located measurement of pressure and a temperature in a single structure. The sensor may include a single launch fiber bonded to a tube a pre-determined distance from a reflective fiber. The end of the reflective fiber not encased within the tube is enclosed within a cap formed of a material that has a refractive index that changes with changing temperature. Alternatively, a material having a refractive index that changes with changing temperature can be inserted into the tube to take the place of the reflective fiber. Multiple launch fibers may be incorporated within a tube.

26 Claims, 8 Drawing Sheets

FIG. 9
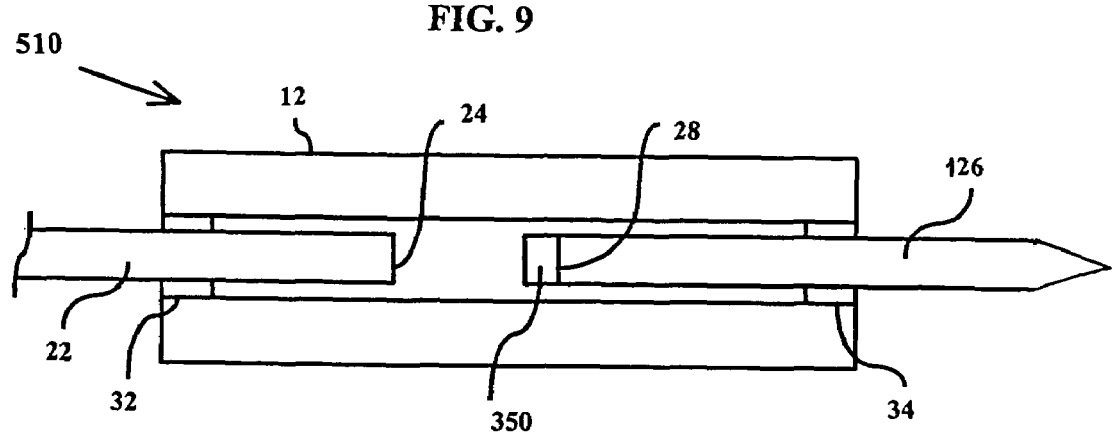
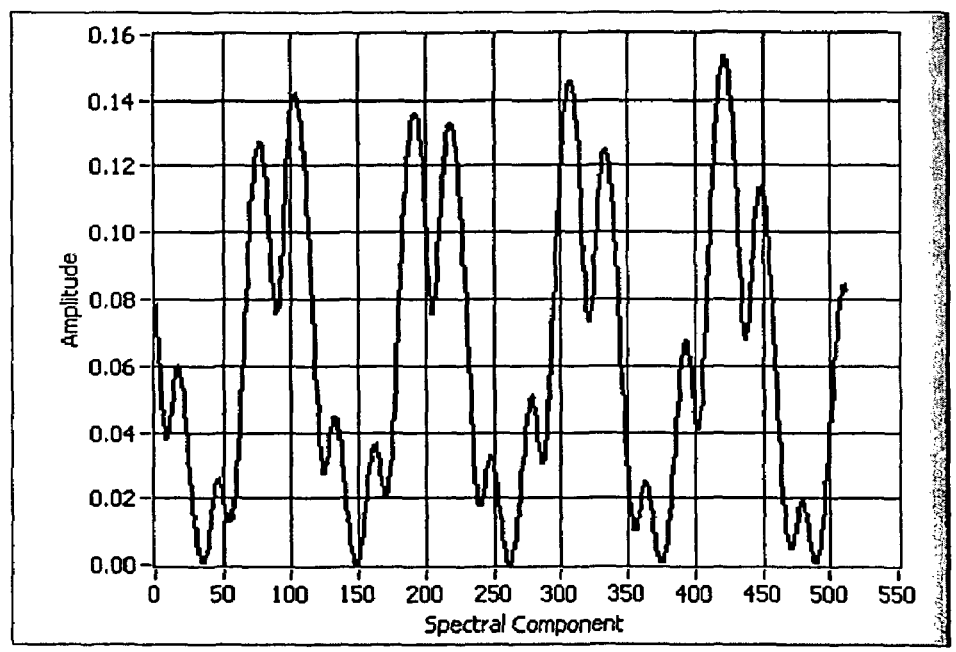
FIG. 10

OPTICAL SENSOR WITH CO-LOCATED PRESSURE AND TEMPERATURE SENSORS

FIELD OF THE INVENTION

The invention generally relates to optical sensors, and more particularly to fiber optic systems having three reflective surfaces and two indexes of refraction in between.

BACKGROUND

Optical fibers have become the communication medium of choice for long distance communicating due to their excellent light transmission characteristics over long distances and the ability to fabricate such fibers in lengths of many kilometers. Sometimes, the information being communicated is video or audio, while other times the information being communicated is data.

In the petroleum industry, it is important to obtain accurate pressure information during, for example, the drilling of an oil well. For instance, while drilling the drill bit may drill into a high pressure layer, and from at least a safety and environmental standpoint it is important to obtain accurate pressure information. Optical fibers are beginning to be used to communicate pressure information from wells being drilled, as well as from already completed wells.

Most known optical fiber systems include only pressure sensors. An example of a known optical sensor is one utilizing a Fabry Perot cavity, which includes two reflective surfaces and a single index of refraction in between. However, as a well is drilled, the temperature increases with increasing distance from the surface. Thus, the deeper an oil well, for example, is drilled, the greater the temperature experienced by the optical pressure sensor. The components forming optical sensors are susceptible to temperature changes, and the failure to account for temperature changes will lead to inaccurate pressure readings by the optical pressure sensor. Further, known methods of constructing optical pressure sensors have made no effort to remove residual gasses trapped in the sensor. There has been no recognition that such residual gasses lead to additional errors.

SUMMARY

An exemplary sensor embodiment, the invention provides an optical sensor comprising a pressure sensor co-located with a temperature sensor.

In an aspect of the exemplary sensor embodiment, the optical sensor includes a launch fiber having an end positioned within a tube and a reflective fiber having a first end positioned an initial distance from the end of the launch fiber. The launch and reflective fibers are bonded to the tube.

In another aspect of the exemplary sensor embodiment, the optical sensor includes a launch fiber having an end positioned within a tube and a material having a refractive index that changes with changing temperature. The material is positioned within the tube a pre-determined distance from the end of the launch fiber.

In another aspect of the exemplary sensor embodiment, the optical sensor includes a first pressure sensor co-located with a first temperature sensor and a second pressure sensor co-located with a second temperature sensor.

An exemplary process embodiment of the invention provides a method of forming an optical sensor. The method comprises forming a temperature sensor utilizing a material with a refractive index that changes with changing temperature and forming a pressure sensor, each of the sensors being formed within a tube.

In an aspect of the exemplary process embodiment, the method includes the steps of filling a cavity of a tube with a material that has a refractive index that changes with a changing temperature, removing a portion of the material from the cavity, attaching a silica disk to an end of the tube and adjacent to the material, inserting an optical fiber in the cavity, and bonding the optical fiber within the cavity a pre-determined distance from the material.

In another aspect of the exemplary process embodiment, the method includes the steps of filling a cap with a material that has a refractive index that changes with a changing temperature, attaching the cap to an end of a tube having a cavity, inserting an optical fiber in the cavity, and bonding the optical fiber within the cavity a pre-determined distance from the material.

In another aspect of the exemplary process embodiment, the method includes the steps of filling at least two cavities in a tube each with a material that has a refractive index that changes with a changing temperature, removing a portion of the material from the cavities, attaching a disk to an end of the tube and adjacent to the material, inserting an optical fiber in each of the cavities, and bonding each of the optical fibers within a respective one of the cavities a pre-determined distance from the material.

These and other advantages and features of the invention will be more readily understood from the following detailed description of the invention which is provided in connection with the accompanying drawings.

BRIEF DESCRIPTION OF THE DRAWINGS

FIG. 9 illustrates an optical sensor formed alternatively than the embodiment illustrated in FIG. 1.

FIG. 10 is a graph indicating spectral data taken by a sensor of FIG. 1.

DETAILED DESCRIPTION OF PREFERRED EMBODIMENTS

Figure 1:
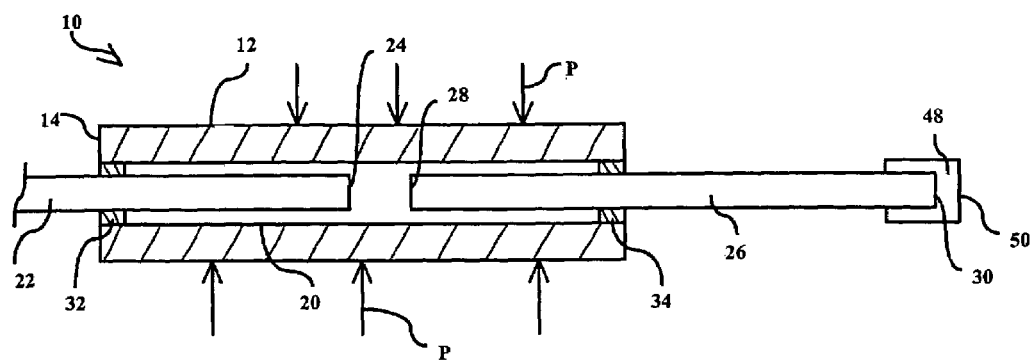
FIG. 1 is a cross-sectional view of an optical sensor constructed in accordance with a first exemplary embodiment of the invention.
Figure 2:
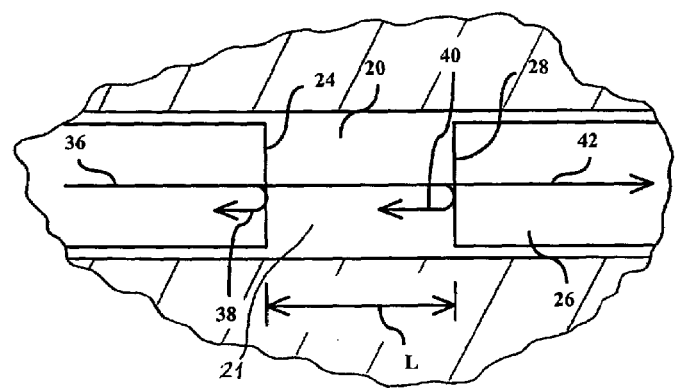
FIG. 2 is an enlarged view of the interface between the launch and reflective fibers of the optical sensor of FIG. 1.
Figure 3:
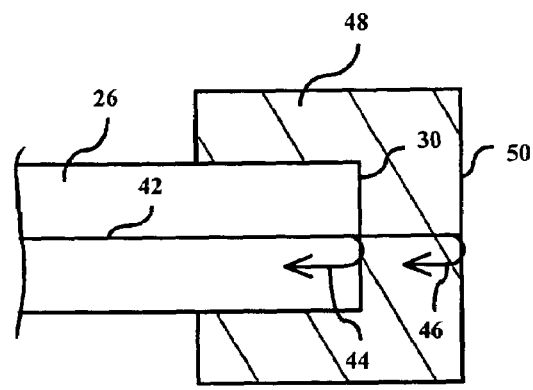
FIG. 3 is an enlarged view of an end of the reflective fiber of the optical sensor of FIG. 1.

With reference to FIGS. 1–3, an optical sensor 10 is shown. The sensor 10 includes an input or launch fiber 22 and a reflective fiber 26, both captured within a cavity 20 of a tube 12. Specifically, the launch fiber 22 has a first end 24 which is separated from a first end 28 of the reflective fiber 26 by a gap 21 of the cavity 20. The launch fiber 22 may be a single mode, multimode, polarization maintaining, or plastic fiber. The reflective fiber 26 may be a coreless, multimode, polarization maintaining, or plastic fiber.

Figure 7:
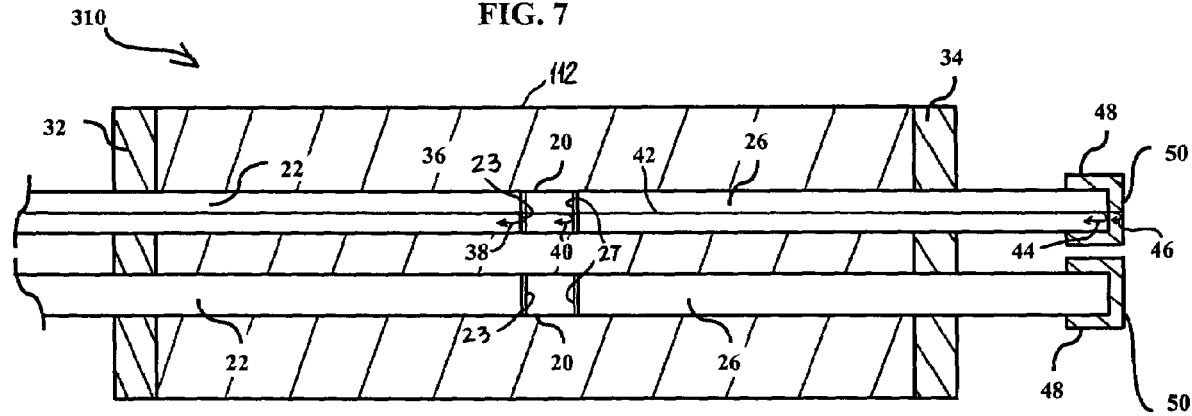
FIG. 7 is a cross-sectional view of an optical sensor formed alternatively than the embodiment illustrated in FIG. 1.

Optical coatings 23, 27 may be applied to, respectively, the first end 24 of the launch fiber 22 and the first end 28 of the reflective fiber 26 (FIG. 7). The optical coatings 23, 27 enhance the spectral characteristics so that demodulation of the gap information may be more accurately and more easily accomplished. Suitable materials for the optical coatings 23, 27 include magnesium fluoride, silicon monoxide, zirconium oxide, tantalum oxide, niobium oxide, silicon carbide, silicon, aluminum oxide, gold, aluminum, titanium, nickel, and chromium. Alternatively, the fiber ends 24 and 28 may be modified to form a lens or lenses to provide a wider range of useful gaps 21.

The launch fiber 22 is attached to a first end 14 of the tube 12 with a first bond 32 and the reflective fiber 26 is attached to a second end 16 of the tube 12 with a second bond 34. The fibers 22, 26 may be attached to the tube 12 through conductive heating, arc welding, laser welding, or through FRIT or solder glass. Further, the fibers 22, 26 may be attached through molecular, epoxy, or anodic attachment mechanisms.

A thick wall 18 extends between the first and second ends 14, 16 of the tube 12. The tube 12 may be formed of a metal, polymer, sapphire, alumina or plastics. Further, the tube 12 may be extruded, drawn or pierced. The tube 12 and the fibers 22, 26 may be coated with a variety of materials, such as, parylene, carbon or titanium oxide to act as a moisture or hydrogen barrier to improve stability and reliability.

The reflective fiber 26 extends beyond the second end 16 of the tube 12. Specifically, a second end 30 of the reflective fiber 26 is enclosed within a reflective material cap 48 beyond the second end 16 of the tube 12. Preferably, the reflective material cap 48 is formed of silicon; however, it should be appreciated that the reflective material cap 48 may be formed of any material which exhibits a changing index of refraction and a changing coefficient of thermal expansion with changing temperature.

The optical sensor 10 receives an initial light portion 36 through the launch fiber 22. As the initial light portion 36 meets the interface between the first end 24 of the launch fiber 22 and the gap 21, a portion (for example, approximately four percent) of the initial light portion 36 is reflected back down the launch fiber 22 as the first reflected light portion 38. The remaining initial light portion 36 continues through the gap 21 of the cavity 20. At the interface between the gap 21 and the first end 28 of the reflective fiber 26, another portion (for example, approximately four percent of light), denoted as the second reflected light portion 40, is reflected back. The remaining light portion 42 continues through the reflective fiber 26.

The initial length L (FIG. 2) of the gap 21 is chosen to correspond to a pre-determined pressure. Specifically, the initial length L of the cavity 20 is chosen so that interferometric measurement of the relative optical displacement between the fiber ends 24 and 28 corresponds to a known pressure, such as, for example, standard pressure of 14.7 pounds per square inch (psi).

As the optical sensor 10 descends into a well, pressure P is exerted against the wall 18 of the tube 12. As the pressure P increases, the wall 18 is pushed inwardly, which affects the gap 21 of the cavity 20. Specifically, as the pressure P increases (with increasing depth from the surface) the gap 21 is lessened. The change in the length L of the gap 21 can therefore be used to calculate the pressure at any point below the surface.

With specific reference to FIG. 3, the remaining light portion 42 continues down the reflective fiber 26 toward the second end 30. At the interface between the second end 30 and the reflective material cap 48, another portion (for example, approximately four percent of light), denoted the third reflected light portion 44, reflects back along the reflective fiber 26. The light remaining travels through the reflective material cap 48. At the cap surface 50 of the reflective material cap 48, another portion (for example, approximately four percent of light), denoted the fourth reflected light portion 46, is reflected back toward the reflective fiber 26.

The reflective material cap 48 is formed of a material so that interferometric measurement of the relative optical displacement between the second end 30 and the cap surface 50 corresponds to a known temperature, such as, for example, standard temperature of 70° F. at the earth's surface. As noted previously, the reflective material cap 48 is formed of a material which exhibits a changing refractive index with changing temperature. Thus, as the optical sensor 10 descends from the surface, the refractive index of the reflective material cap 48 will change with the increasing temperature, thus altering the optical displacement between the second end 30 and the cap surface 50. The difference in the optical displacements between the surface and at some depth below the surface can be equated with a temperature at that depth. Knowing the temperature at that depth will allow for the alteration of the pressure calculations to more accurately portray the pressure at that same depth.

Through the above-described process, pressure at a particular depth below the surface can be calculated through the measurement of the optical displacements, where the physical distance between the first pair of reflection points is changed and the index of refraction remains the same. Further, this pressure calculation can be modified to take into account the change in temperature experienced at that particular depth below the surface. The modification is accomplished by measuring the optical displacements, where the physical distance between the second pair of reflection points remains largely unchanged due to the pressure and the index of refraction is altered.

Figure 4A:
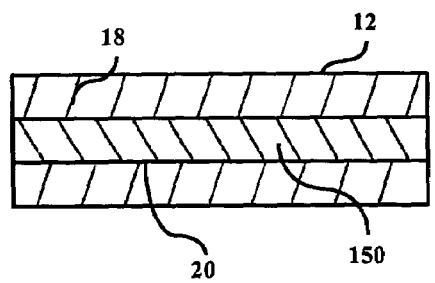
FIGS. 4A–D illustrate the formation of an optical sensor in accordance with a second exemplary embodiment of the invention.
Figure 4B:
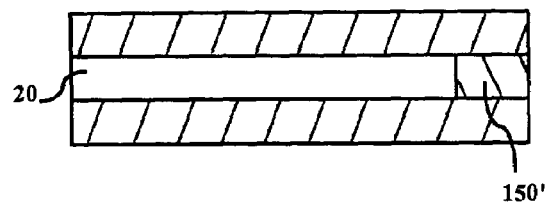

Referring now to FIGS. 4A–D and 5, a process of forming a second exemplary embodiment of the invention is illustrated. An optical pressure sensor 110 (FIG. 4D) is formed including the tube 12. A material 150 having a refractive index that changes with changing temperature, such as, for example, silicon, is formed in the cavity 20 of the tube 12 (FIG. 4A). Then, the material 150 is etched down to leave a remaining material 150' (FIG. 4B). For a material 150 formed of silicon, an appropriate etch material may be potassium hydroxide (KOH).

Figure 4C:
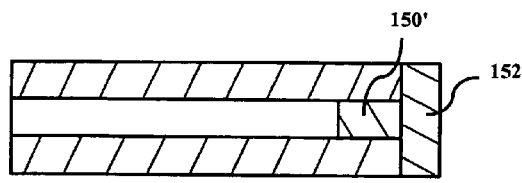
Figure 4D:
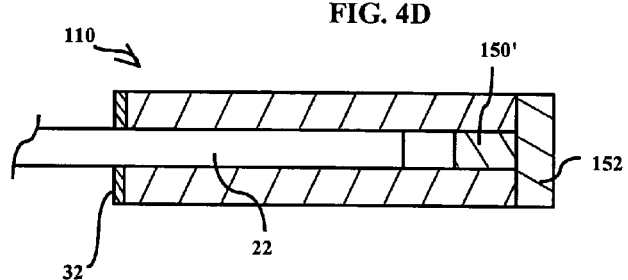
Figure 5:
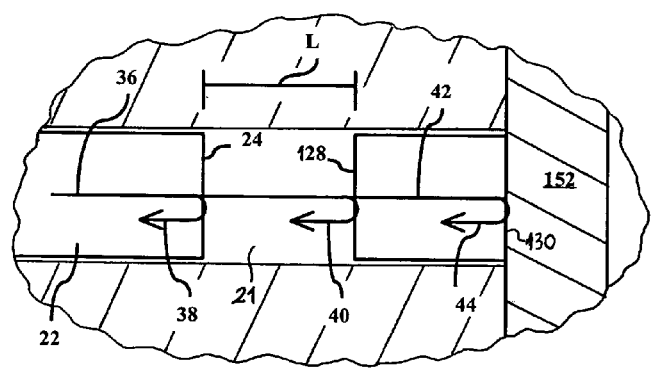
FIG. 5 is an enlarged view of the interface between the launch and reflective fibers of the optical sensor of FIG. 4D.

As illustrated in FIG. 4C, a disk 152 is attached to the end of the tube 12 where the remaining material 150' is located. The disk 152 is attached by a suitable mechanism, such as, for example, laser welding or solder glass. Further, the disk 152 is formed of a material having similar properties to the tube 12, such as, for example, fused silica. Then, the launch fiber 22 is inserted into the cavity 20 and positioned an appropriate length L from the remaining material 150' (FIG. 4D). The distance is maintained by bonding the launch fiber 22 to the tube 12 through the first bond 32. The cavity 20 may have a 130 micron diameter, and the launch fiber 22 may have a 125 micron diameter.

The initial light portion 36 is shined through the launch fiber 22 at a standard pressure and temperature to obtain a base pressure and temperature. Specifically, the optical displacement between the fiber ends 24 and 128 is noted to ascertain the pressure at the surface. Further, the optical displacement between the fiber end 128 and an interface 130 between the remaining material 150' and the silica disk 152 is noted to ascertain the temperature at the surface.

Then, as described with the embodiment of FIGS. 1–3, with the optical sensor 110 descending from the surface, the pressure P alters the gap 21 between the first end 24 of the launch fiber 22 and the end 128 of the remaining material 150', and thus alters the optical displacement between the fiber end 24 and the end 128. Further, as the optical sensor 110 descends, and the temperature increases, the index of refraction of the remaining material 150' changes, thus altering the optical displacement between the end 128 and the interface 130. Through this arrangement, the temperature gap material (i.e., the remaining material 150') is positioned inside the tube 12 and is thus unaffected by pressure.

Figure 6A:
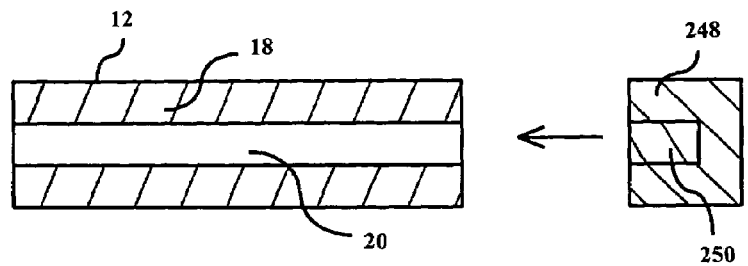
FIGS. 6A–B illustrate an optical sensor formed alternatively than the embodiment illustrated in FIG. 1.
Figure 6B:
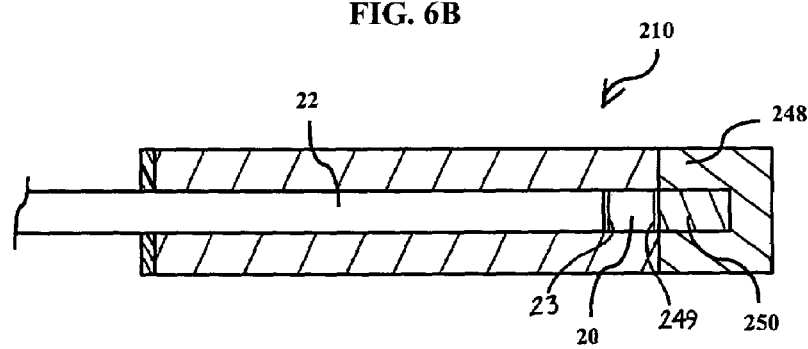

An alternative process to that described with regard to FIGS. 4A–D and 5 is illustrated in FIGS. 6A–B. A tube 12 with an empty cavity 20 is attached to a cap 248 including a material 250 that has a changing refractive index with changing temperature. The material 250 may preferably be silicon. The material 250 may be inserted into the cap 248 and lapped down flat so that the cap 248 can be bonded to an end of the tube 12. Then, the launch fiber 22 is inserted into the cavity 20 to a pre-determined length from the material 250 and bonded into place to form an optical sensor 210. The end of the launch fiber 22 may be coated with an optical coating 23, while the material 250 may have an optical coating 249 applied to it.

Referring to FIG. 7, an optical sensor 310 is shown. As illustrated, a pair of launch fibers 22 are bonded within cavities 20 of a tube 112. Further, a pair of reflective fibers 26 are bonded a distance from the launch fibers 22. Each end of the reflective fibers 26 not within the tube 112 is enclosed within a reflective cap 48. The optical sensor 310 functions similarly to the optical sensor 10 described with reference to FIGS. 1–3. The optical sensor 310 has an additional advantage of providing redundancy in the same space. Further, the optical sensor 310 can be formed with two pressure gaps of different initial lengths L (FIG. 2) and two temperature gaps of different lengths (or of different materials). The differences in the lengths are by some ratio. By forming the optical sensor 310 in this manner, additional information can be obtained from the sensor. It should be appreciated that more than two launch fibers can be utilized in the optical sensor 310.

Figure 8A:
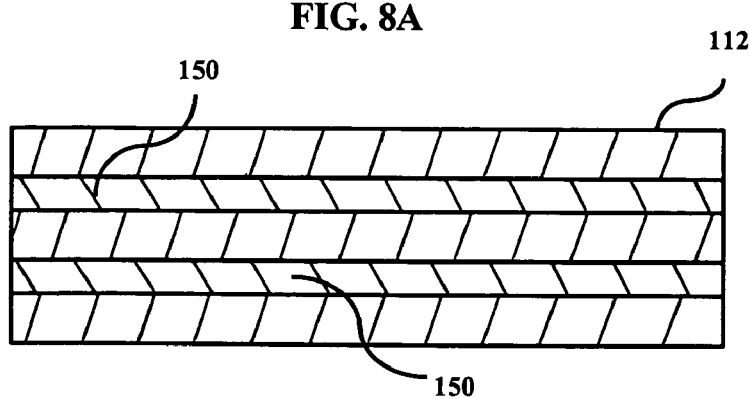
FIGS. 8A–D illustrate the formation of an optical sensor formed alternatively than the embodiment illustrated in FIG. 1.
Figure 8B:
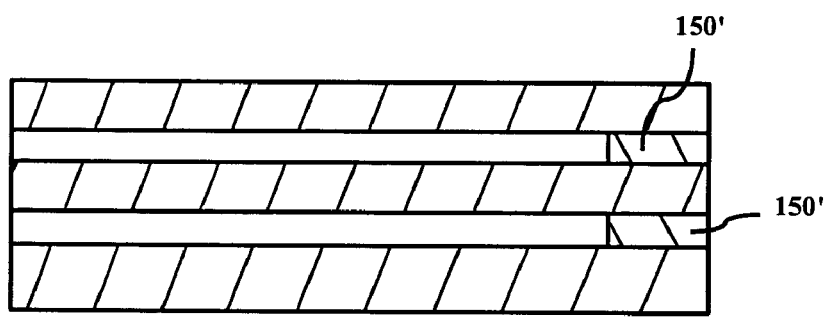
Figure 8C:
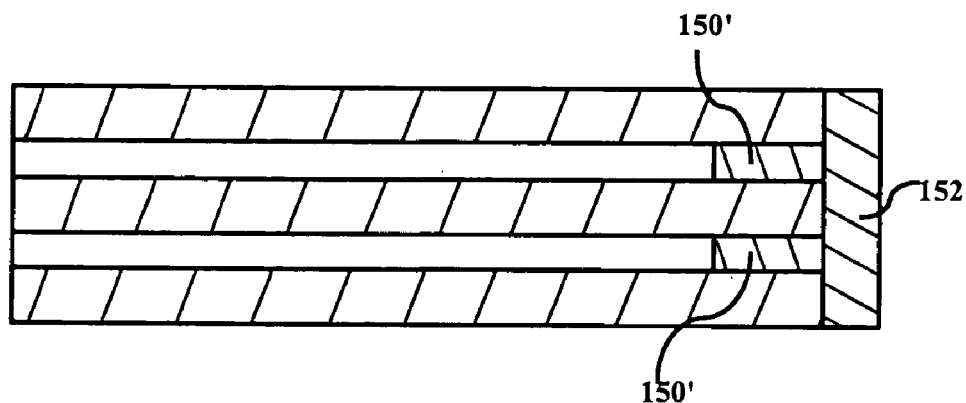
Figure 8D:
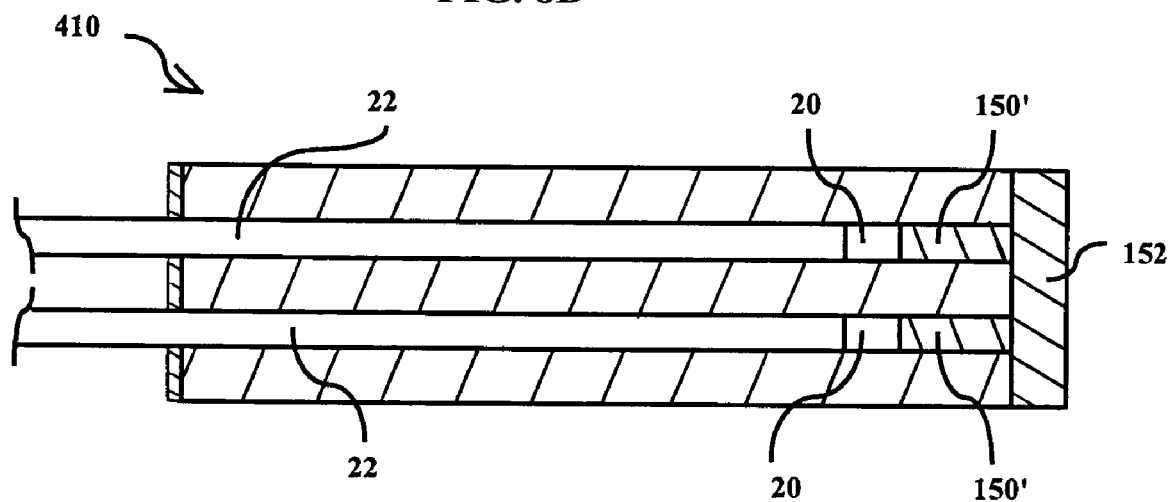

FIGS. 8A–D illustrate a process for forming an optical sensor 410 (FIG. 8D). The cavities 20 of the tube 112 are filled with a material 150 that has a changing refractive index with changing temperature, such as silicon (FIG. 8A). The material 150 is etched down to leave a remaining material 150' (FIG. 8B). A fused silica disk 152 is bonded to the tube 112 at the end where the remaining material 150' is located (FIG. 8C). Then, launch fibers 22 are inserted into the cavities 20 and bonded into place. The optical sensor 410 works similarly to the optical sensor 110 described with reference to FIGS. 4A–D and 5.

Referring now to FIG. 9, an optical sensor 510 is shown with the launch fiber 22 and a reflective fiber 126. At the fiber end 28 of the reflective fiber 126 is positioned a chip 350. The chip 350 is formed of a material that has a changing index of refraction with changing temperature, such as, for example, silicon. Through this arrangement, optical displacements between the fiber end 24 and the chip 350 can be utilized to determine pressure, and optical displacements between the ends of the chip 350 can be utilized to determine temperature. The reflective fiber 126 includes a tapered end that serves to reduce/minimize any additional, unwanted reflections from the far end of the fiber 126 that may increase errors in the demodulation calculations.

Figure 11:
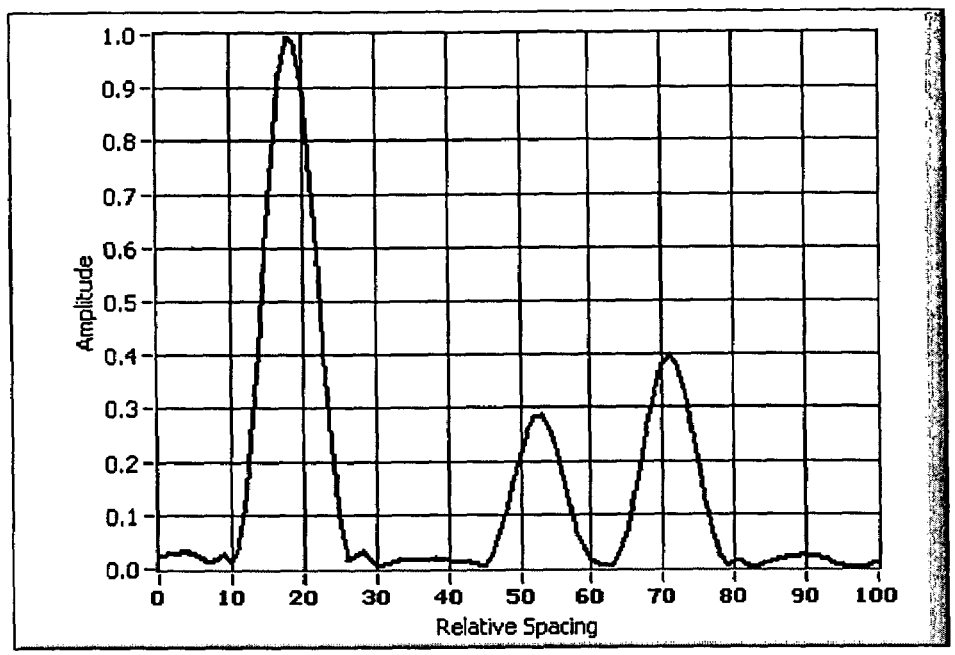
FIG. 11 is a graph of the spectral data of FIG. 10 converted by Fourier transform.
Figure 12:
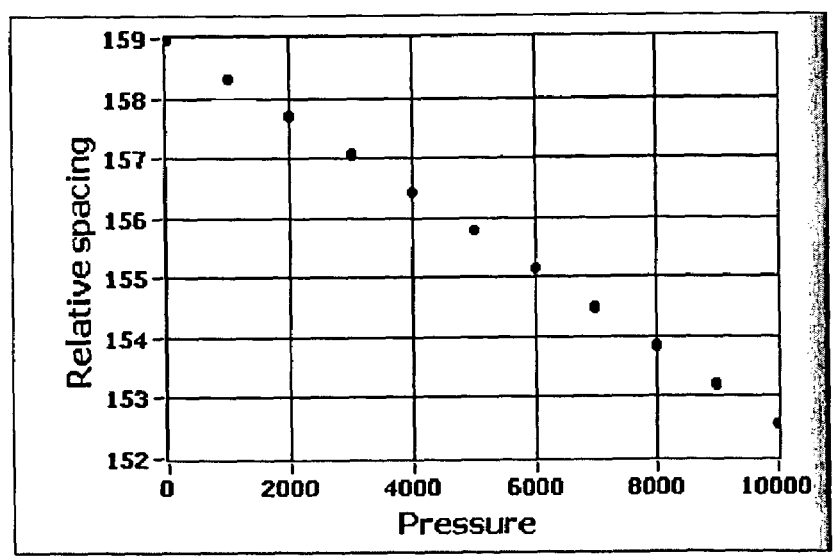
FIG. 12 is a graph of the relative spacing of reflective surfaces versus pressure.

The optical sensors 10, 110, 210, 310, 410, 510 each provide sets of reflective surfaces, the relative spacings between which change with the application of pressure and temperature. Light reflected from and transmitted through the surfaces interferes, optically generating spectral patterns. The measured spectral patterns can be converted to spatial patterns. Either type of patterns can be converted to a measurement of the relative spacings of the reflective surfaces with an appropriate algorithm. For example, spectral data from an optical sensor, such as the sensors 10, 110, 210, 310, 410, 510, is shown in FIG. 10. A Fourier transform is used to convert this spectral pattern into a spatial pattern in FIG. 11. The peaks indicate the relative locations of the reflective surfaces. As shown in FIG. 11, the locations of the reflective surfaces are at about 18, 53 and 71. A calibration of the sensor over pressure and temperature is conducted and subsequently the relative locations of the reflective surfaces can be converted to pressure and temperature. FIG. 12 indicates pressure versus relative spacing.

While the foregoing has described in detail exemplary embodiments of the invention, it should be readily understood that the invention is not limited to the disclosed embodiments. Rather the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired by Letters Patent of the United States is:

1. An optical sensor comprising a pressure sensor co-located with a temperature sensor, wherein the pressure sensor and the temperature sensor are operatively connected to a launch fiber, said temperature sensor is made from a material substantially different than the material of the launch fiber, and said pressure sensor is defined between an end of the launch fiber and a reflective surface positioned at a predetermined distance from the end of the launch fiber within a housing, wherein the reflective surface is disposed on an end member, and wherein the launch fiber and the member are bonded to the housing.

2. The optical sensor of claim 1, wherein the end member comprises a reflective fiber and said reflective surface comprises a first end of the reflective fiber, wherein the reflective fiber is bonded to the housing.

3. The optical sensor of claim 2, wherein an optical coating is applied on at least one of said end of said launch fiber and said first end of said reflective fiber.

4. The optical sensor of claim 2, wherein said temperature sensor is located at a second end of said reflective fiber.

5. The optical sensor of claim 4, wherein said launch and reflective fibers are bonded into a cavity of said housing.

6. The optical sensor of claim 5, wherein said pressure sensor determines a pressure by measuring an optical displacement between the end of said launch fiber and the first end of said reflective fiber.

7. The optical sensor of claim 6, wherein as pressure is exerted against said housing, the distance between the end of the launch fiber and the first end of the reflective fiber is diminished.

8. The optical sensor of claim 4, wherein said temperature sensor determines a temperature by measuring an optical displacement between the second end of said reflective fiber and a surface of said temperature sensor.

9. The optical sensor of claim 1, wherein said end member comprises the temperature sensor and said reflective surface comprises a first surface on the temperature sensor, and wherein the temperature sensor is bonded to the housing.

10. The optical sensor of claim 9, wherein said temperature sensor determines a temperature by measuring an optical displacement between the first surface and a second surface of the temperature sensor.

11. A method of forming an optical sensor, comprising the steps of:
    filling a cavity of a tube with a material that has a refractive index that changes with a changing temperature;
    removing a portion of the material from the cavity;
    attaching a silica disk to an end of the tube and adjacent to the material;
    inserting an optical fiber in the cavity; and
    bonding the optical fiber within the cavity a pre-detennined distance from the material.

12. The method of claim 11, wherein the material is silicon and said removing step is accomplished with a chemical etchant.

13. A method of forming an optical sensor, comprising the steps of: filling a cap with a material that has a refractive index that changes with a changing temperature;
    attaching the cap to an end of a tube having a cavity;
    inserting an optical fiber in the cavity; and bonding the optical fiber within the cavity a pre-determined distance from the material.

14. The method of claim 13, further comprising lapping the material in the cap prior to attaching the cap to the tube.

15. The method of claim 13, wherein the material is silicon and said removing step is accomplished with potassium hydroxide.

16. An optical sensor, comprising:
    a first pressure sensor connected to a first launch fiber and co-located with a first temperature sensor; and
    a second pressure sensor connected to a second launch fiber and co-located with a second temperature sensor, wherein the first pressure and temperature sensors are co-located with the second pressure and temperature sensors.

17. The optical sensor of claim 16, wherein said first and second pressure sensors are located within a housing.

18. The optical sensor of claim 17, wherein at least one of said first and second pressure sensors comprises:
    a reflective fiber having a first end positioned an initial distance from the end of said launch fiber, said reflective fiber being bonded to said housing.

19. The optical sensor of claim 18, wherein at least one of said first and second temperature sensors comprises a material with a refractive index that changes with a changing temperature, wherein said material is operatively connected to a second end of said reflective fiber.

20. A method of forming an optical sensor, comprising the steps of:
    filling at least two cavities in a tube each with a material that has a refractive index that changes with a changing temperature;
    removing a portion of the material from the cavities;
    attaching a disk to an end of the tube and adjacent to the material;
    inserting an optical fiber in each of ihe cavities; and
    bonding each of the optical fibers within a respective one of the cavities a pre-detennined distance from the material.

21. The method of claim 20, wherein the material comprises silicon and said removing is accomplished with potassium hydroxide.

22. The optical sensor of claim 1, wherein the material of the temperature sensor has a refractive index that changes with temperature.

23. The optical sensor of claim 1, wherein the temperature sensor is located outside the housing.

24. The optical sensor of claim 4, wherein the temperature sensor comprises a cap attached to the second end of the reflective fiber.

25. The optical sensor of claim 10, wherein the launch fiber and the temperature sensor are bonded to a tube.

26. The optical sensor of claim 10, wherein the temperature sensor comprises a cap bonded to the tube.

* * * * *